United States Patent [19]
Lord

[11] Patent Number: 5,715,695
[45] Date of Patent: Feb. 10, 1998

[54] AIR CONDITIONED SEAT

[76] Inventor: Kevin F. Lord, 310 S. Jefferson St., Apt. #29B, Placentia, Calif. 92670-5473

[21] Appl. No.: 703,634

[22] Filed: Aug. 27, 1996

[51] Int. Cl.⁶ .............. F25D 23/12; A47C 27/00; A47C 7/72
[52] U.S. Cl. .............. 62/259.3; 62/331; 62/261; 297/180.1; 5/421; 5/423
[58] Field of Search .............. 62/259.3, 331, 62/261; 297/180.1, 33, 180.13; 5/128, 408, 421, 423, 469, 284, 347; 454/907

[56] References Cited

U.S. PATENT DOCUMENTS

| | | |
|---|---|---|
| 2,722,266 | 11/1955 | Kersten .............. 62/261 |
| 2,782,834 | 2/1957 | Vigo .............. 62/261 |
| 2,912,832 | 11/1959 | Clark .............. 62/261 |
| 3,550,523 | 12/1970 | Segal .............. 62/261 |
| 4,006,604 | 2/1977 | Seff .............. 62/261 |
| 4,712,832 | 12/1987 | Antolini et al. .............. 297/180 |
| 4,946,220 | 8/1990 | Wyon et al. .............. 297/180 |
| 5,016,302 | 5/1991 | Yu .............. 5/423 |
| 5,524,439 | 6/1996 | Gallup et al. .............. 62/3.5 |

*Primary Examiner*—William Doerrler

[57] ABSTRACT

An air conditioned seat including an air conditioning pad comprising an upper pad and a lower pad. The air conditioning pad has an upper layer, a lower layer and a hollow chamber therebetween. The upper layer has a plurality of apertures therethrough leading into the hollow chamber. A coupling tube is included with a first end coupled with an existing air conditioner of an automobile. The coupling tube has a second end portion couplable to the tube of the air conditioning pad.

1 Claim, 3 Drawing Sheets

AIR CONDITIONED SEAT

BACKGROUND OF THE INVENTION

1. Field of the Invention

The present invention relates to an air conditioned seat and more particularly pertains to coupling with an air conditioner of an automobile to provide conditioned air from the seat with an air conditioned seat.

2. Description of the Prior Art

The use of ventilated seats is known in the prior art. More specifically, ventilated seats heretofore devised and utilized for the purpose of communicating air through the seats are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,385,382 to Single, II et al. discloses a combination seat frame and ventilation apparatus.

U.S. Pat. No. 5,138,851 to Mardikian discloses an active seat cooling system.

U.S. Pat. No. Des. 309,394 to Morris discloses the ornamental design for a thermalized children's car seat cushion.

U.S. Pat. No. 4,997,230 to Spitalnick discloses an air conditioned cushion covers.

U.S. Pat. No. 5,382,075 to Shih discloses a chair seat with a ventilation device.

U.S. Pat. No. 5,102,189 to Saito et al. discloses a ventilated seat.

While these devices fulfill their respective, particular objective and requirements, the aforementioned patents do not describe an air conditioned seat for coupling with an air conditioner of an automobile to provide conditioned air from the seat.

In this respect, the air conditioned seat according to the present invention substantially departs from the conventional concepts and designs of the prior art, and in doing so provides an apparatus primarily developed for the purpose of coupling with an air conditioner of an automobile to provide conditioned air from the seat.

Therefore, it can be appreciated that there exists a continuing need for new and improved air conditioned seat which can be used for coupling with an air conditioner of an automobile to provide conditioned air from the seat. In this regard, the present invention substantially fulfills this need.

SUMMARY OF THE INVENTION

In the view of the foregoing disadvantages inherent in the known types of ventilated seats now present in the prior art, the present invention provides an improved air conditioned seat. As such, the general purpose of the present invention, which will be described subsequently in greater detail, is to provide a new and improved air conditioned seat and method which has all the advantages of the prior art and none of the disadvantages.

To attain this, the present invention essentially comprises a car seat adapted for securement within an automobile. The car seat has a lower portion and an upper portion. The upper portion has a head rest secured to an upper end thereof. The device includes a pair of air conditioning pads comprising an upper pad and a lower pad. The upper pad is disposed within an interior of the upper portion of the car seat. The lower pad is disposed within an interior of the lower portion of the car seat. Each of the air conditioning pads has an upper layer, a lower layer and a hollow chamber therebetween. The upper layer has a plurality of apertures therethrough leading into the hollow chamber. The lower layer has a tube extending outwardly therefrom. The device includes a coupling tube having a first end coupled with of an existing air conditioner of an automobile. The coupling tube has a branched second end portion couplable to the tubes of the upper pad and the lower pad of the pair of air conditioning pads.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air conditioned seat which has all the advantages of the prior art ventilated seats and none of the disadvantages.

It is another object of the present invention to provide a new and improved air conditioned seat which may be easily and efficiently manufactured and marketed.

It is a further object of the present invention to provide a new and improved air conditioned seat which is of durable and reliable construction.

An even further object of the present invention is to provide a new and improved air conditioned seat which is susceptible of a low cost of manufacture with regard to both materials and labor, and which accordingly is then susceptible of low prices of sale to the consuming public, thereby making such an air conditioned seat economically available to the buying public.

Even still another object of the present invention is to provide a new and improved air conditioned seat for coupling with an air conditioner of an automobile to provide conditioned air from the seat.

Lastly, it is an object of the present invention to provide a new and improved air conditioned seat including an air conditioning pad comprising an upper pad and a lower pad. The air conditioning pad has an upper layer, a lower layer and a hollow chamber therebetween. The upper layer has a plurality of apertures therethrough leading into the hollow chamber. A coupling tube is included with a first end coupled with an existing air conditioner of an automobile. The coupling tube has a second end portion couplable to the tube of the air conditioning pad.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
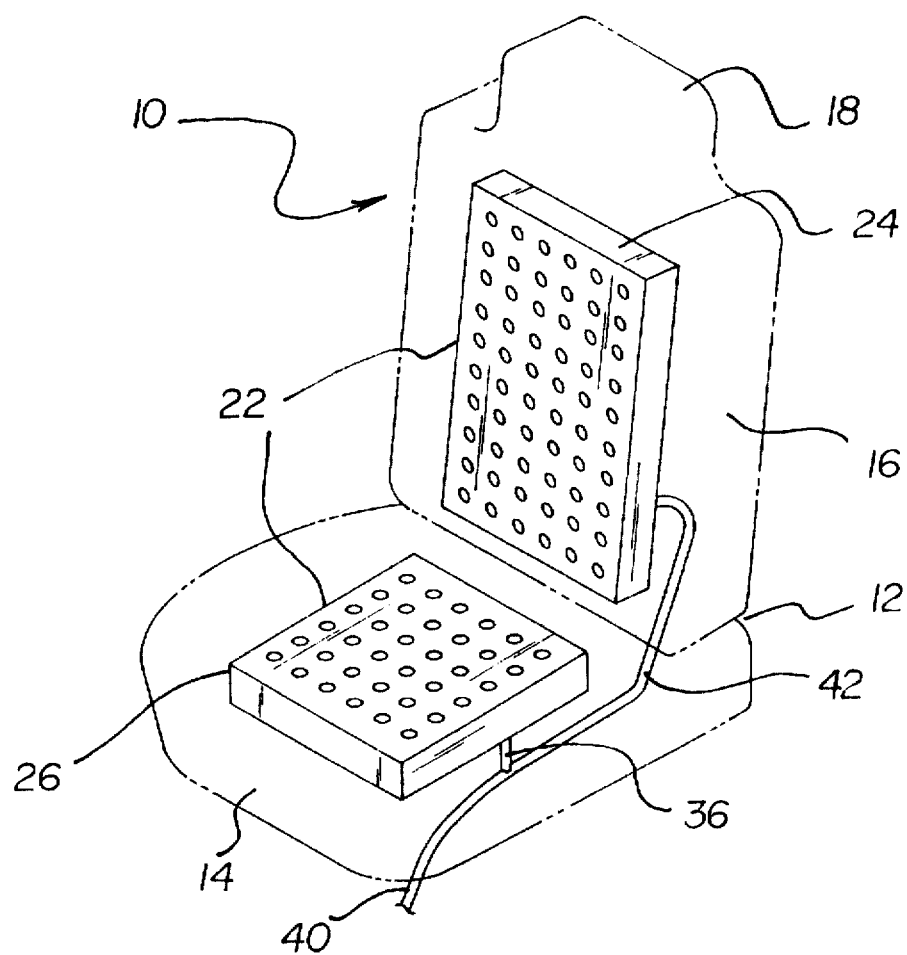
FIG. 1 is a perspective view of the preferred embodiment of the air conditioned seat constructed in accordance with the principles of the present invention.
Figure 2:
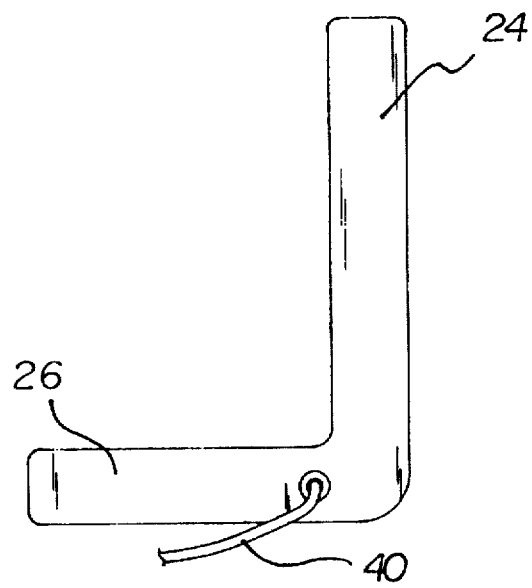
FIG. 2 is a side elevation view of a second embodiment of the present invention.
Figure 3:
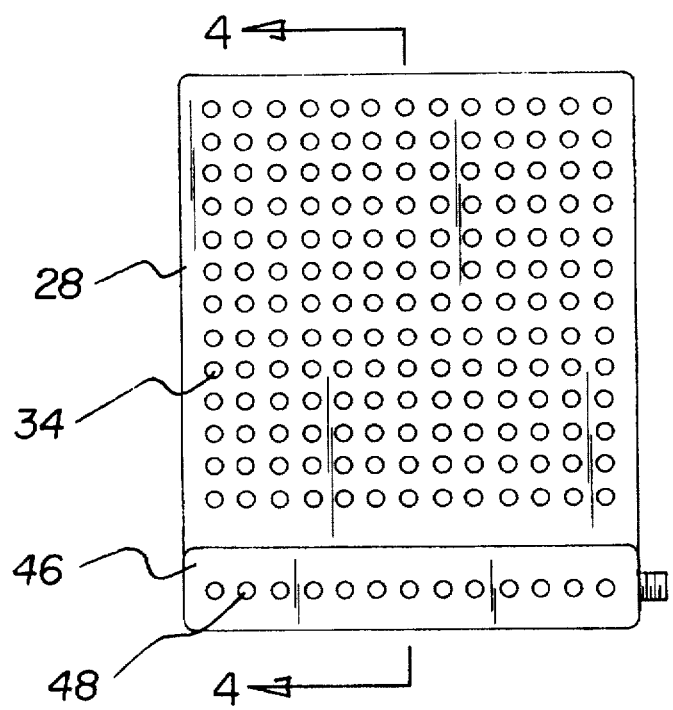
FIG. 3 is a front elevation view of the second embodiment of the present invention.
Figure 4:
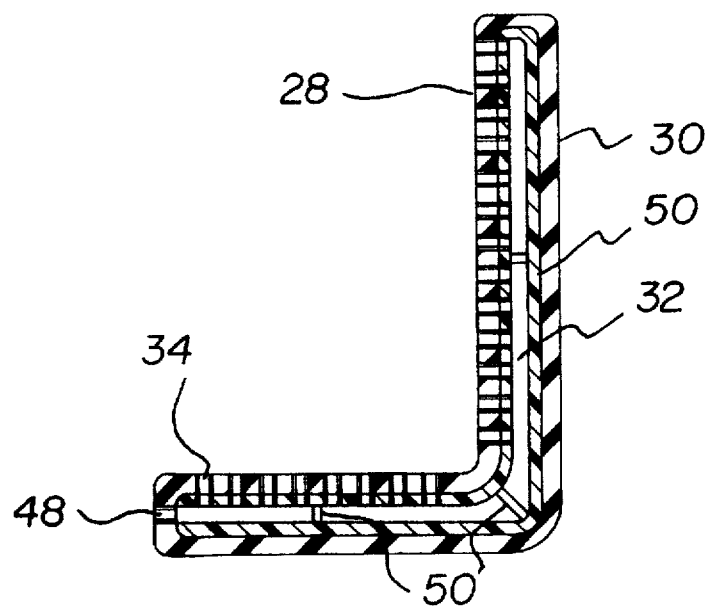
FIG. 4 is a cross-sectional view as taken along line 4—4 of FIG. 3.
Figure 5:
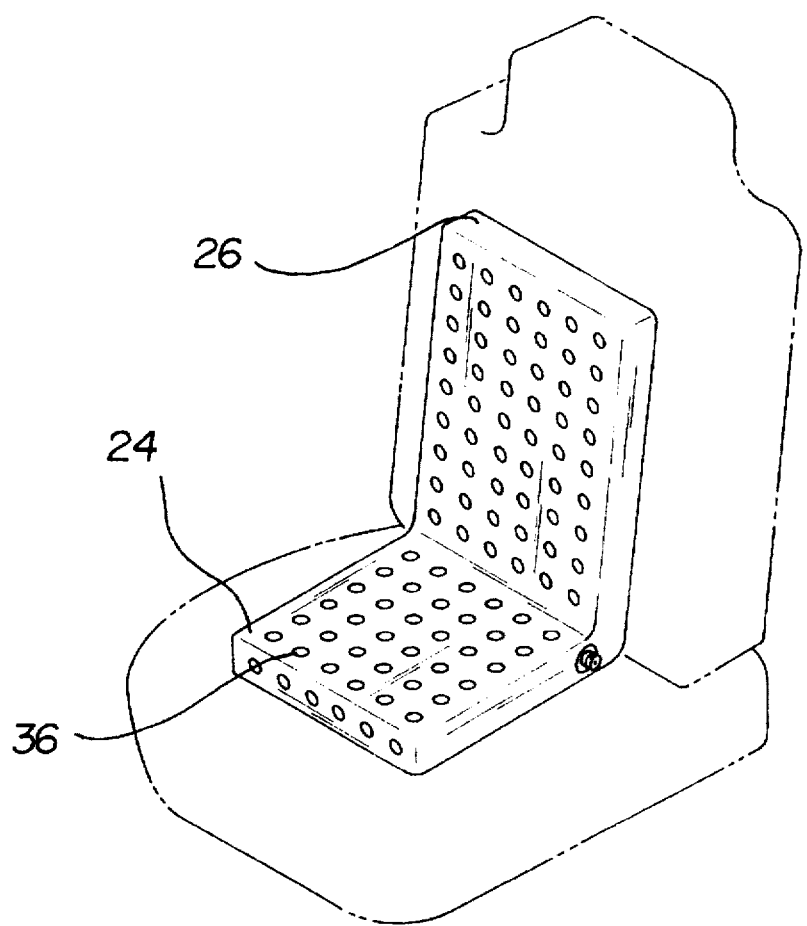
FIG. 5 is a perspective view of the second embodiment in place on an existing car seat.
Figure 6:
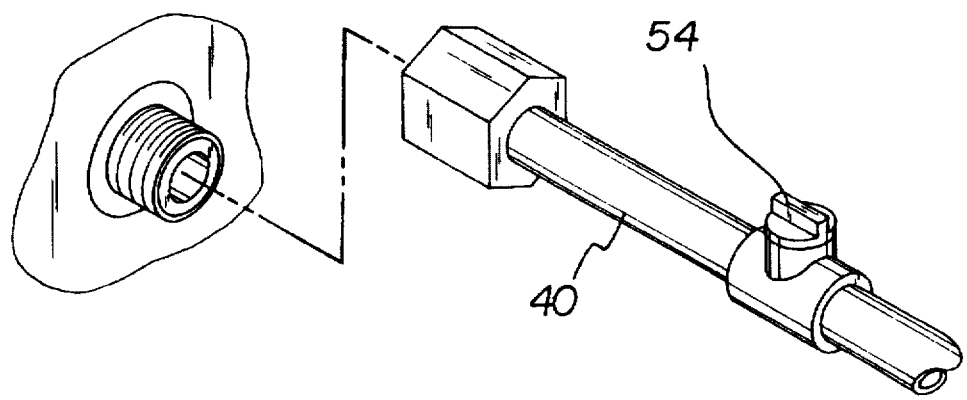
FIG. 6 is a perspective view of the coupling tube and valve of the present invention.

With reference now to the drawings, and in particular, to FIGS. 1–6 thereof, the preferred embodiment of the new and improved air conditioned seat embodying the principles and concepts of the present invention and generally designated by the reference number 10 will be described.

Specifically, it will be noted in the various Figures that the device relates to a air conditioned seat for coupling with an air conditioner of an automobile to provide conditioned air from the seat. In its broadest context, the device consists of a car seat, an air conditioned pad and a coupling tube. Such components are individually configured and correlated with respect to each other so as to attain the desired objective.

The device 10 includes a car seat 12 adapted for securement within an automobile. The car seat 12 has a lower portion 14 and an upper portion 16. The upper portion 16 has a head rest 18 secured to an upper end thereof.

The device 10 includes a pair of air conditioning pads 22 comprising an upper pad 24 and a lower pad 26. The upper pad 24 is disposed within an interior of the upper portion 16 of the car seat 12. The lower pad 26 is disposed within an interior of the lower portion 14 of the car seat 12. Each of the air conditioning pads 22 has an upper layer 28, a lower layer 30 and a hollow chamber 32 therebetween. The upper layer 28 has a plurality of apertures 34 therethrough leading into the hollow chamber 32. The upper layer 28 and the lower layer 30 each have a tube 36 extending outwardly therefrom.

The device 10 includes a coupling tube 40 having a first end (not shown) coupled with an existing compressor of an existing air conditioner of an automobile (not shown). The coupling tube 40 has a branched second end portion 42 couplable to the tubes 36 of the upper pad 24 and the lower pad 26 of the pair of air conditioning pads 22.

A second embodiment of the present invention is shown in FIGS. 2–5 and includes substantially all of the components of the present invention further including where the device 10 is constructed as one solid piece for use in after market automobiles. The device 10, in use, will be placed on the automobiles seat for the user to sit directly upon. The upper pad 24 and the lower pad 26 of the air conditioned pad 22 are joined together in a generally perpendicular arrangement and positioned atop an automobile car seat. A front edge 46 of the lower pad 30 has a plurality of apertures 48 therethrough leading into the hollow chamber 32 thereof. The hollow chamber 32 of the upper pad 24 and the lower pad 26 have a plurality of supports 50 disposed therein positioned between the upper layer 24 and lower layer 26 thereof. The plurality of supports 50 allow the plurality of apertures 34,46 to remain open when the user sits on the pad.

A further embodiment of the present invention would include a valve 54 disposed within the coupling tube 40 for selectively controlling communication of conditioned air from the existing air conditioner to the air conditioning pad 22. The valve 54 could be incorporated into the device 10 on either of the first two embodiments to either allow or prevent conditioned air into the pads 22.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An air conditioned seat for coupling with an air conditioner of an automobile to provide conditioned air from the seat comprising, in combination:

a car seat adapted for securement within an automobile, the car seat having a lower portion and an upper portion, the upper portion having a head rest secured to an upper end thereof;

a pair of plastic air conditioning pads with a rubber lining comprising an upper pad and a lower pad, the upper pad being disposed on the upper portion of the car seat, the lower pad being disposed atop the lower portion of the car seat, each of the air conditioning pads having an upper layer, an lower layer and a hollow chamber therebetween, the upper layer having a plurality of apertures therethrough leading into the hollow chamber, the lower layer having a tube extending outwardly therefrom;

a coupling tube having a first end coupled with an existing air conditioner of an automobile, the coupling tube having a branched second end portion couplable to the tubes of the upper pad and the lower pad of the pair of air conditioning pads for permitting the transfer of conditioned air thereto; and a valve disposed within the coupling tube for selectively controlling communication of the conditioned air;

said upper pad and lower pad of the air conditioned pad joined together in a generally perpendicular arrangement and positioned atop the car seat;

said hollow chamber of the upper pad and the lower pad having a plurality of discrete supports between the upper and lower layers thereof;

said lower pad having a front edge which is equipped with a plurality of apertures therethrough leading into the hollow chamber thereof.

* * * * *